United States Patent Office 3,437,444
Patented Apr. 8, 1969

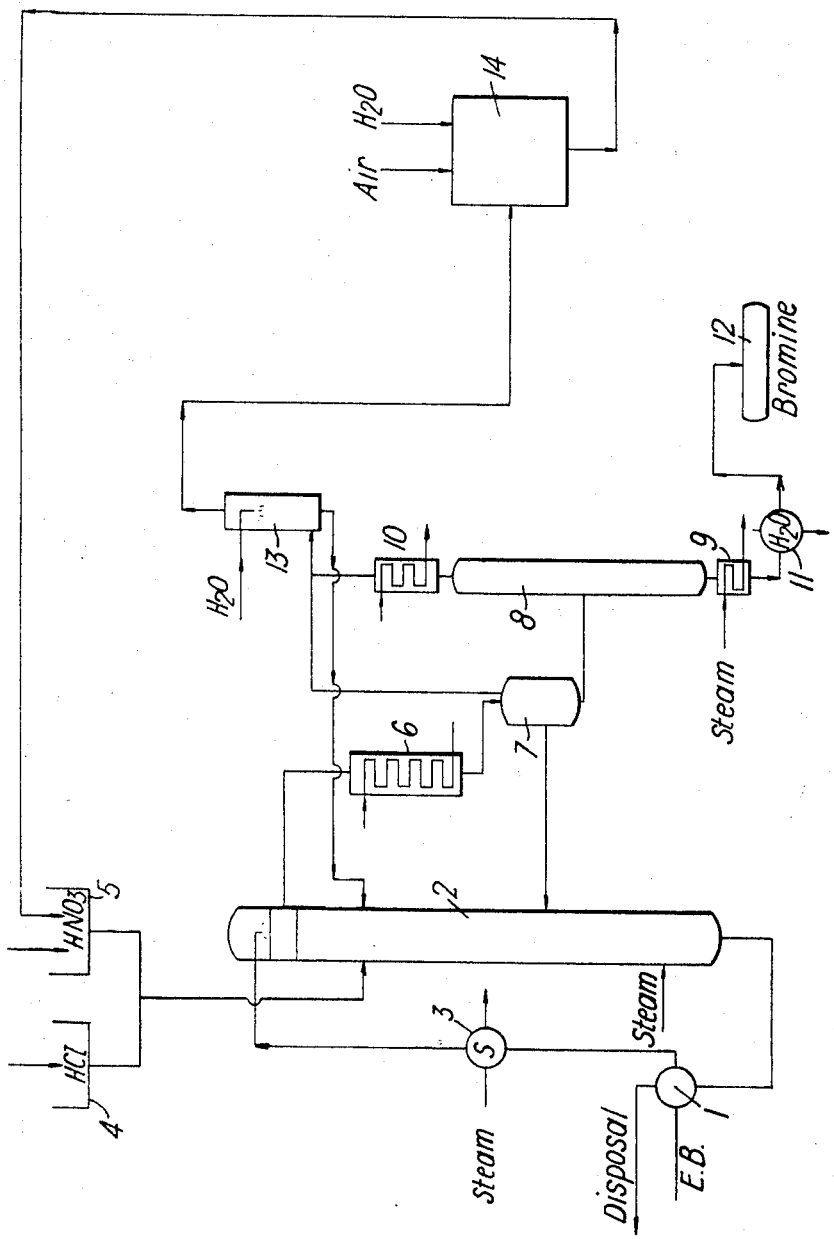

3,437,444
BROMINE PRODUCTION
Joachim Kenat, Beersheba, Israel, assignor to Dead Sea
Works Ltd., Beersheba, Israel, a company of Israel
Filed June 13, 1966, Ser. No. 556,951
Claims priority, application Israel, June 27, 1965,
23,817
Int. Cl. C01b 7/10
U.S. Cl. 23—216        5 Claims

ABSTRACT OF THE DISCLOSURE

Production of elementary bromine from a bromide brine by treatment with a mixture of $HNO_3$ and $HCl$ in a molar ratio of approximately 1:3 to produce $NOBr_3$, followed by separation of $NOBr_3$ and heat-decomposition thereof to produce elementary bromine on the one hand and $NO$ on the other hand, which latter is reconverted into $HNO_3$ which is recycled.

---

The present invention concerns a process for the recovery of elementary bromine from saline brines containing bromides together with other salts. The brine from which elementary bromine can be recovered in accordance with the present invention must contain at least 100 g./l. of halide ions of which at least 2 g./l. must be bromide, at least 1.4 mole/liter of $Ca^{++}$ or $Mg^{++}$ or a mixture of the two and not more than 75 g./l. of $SO_4^{--}$. Such brines will be referred to hereinafter for short as "bromide brines."

Conventionally, elementary bromine is recoverd from bromide brines by oxidation with elementary chlorine followed by stripping the brine of the liberated bromine, e.g. by steam or by air. These known processes are not quite satisfactory because of the large quantities of elementary chlorine required.

It is the object of the present invention to provide a new and improved process for the recovery of elementary bromine from brimide brines.

In accordance with the invention there is provided a process for the production of elementary brimine from bromide brines (as herein defined), comprising the steps of introducing into the brine nitric acid and hydrochloric acid in a molar ratio of substantially $HNO_3:HCl=1:3$, separating from the reaction mixture a liquid product containing compounded nitrogen and bromine, submitting said liquid product to a heat treatment, separately recovering as products of such heat treatment bromine and a gaseous nitrogen oxide containing fraction, and contacting the latter with water and air thereby to recover nitric acid.

The relative proportions of N and Br in the above liquid product correspond to the compound nitrosyl tribromide —$NOBr_3$—. Since, moreover, the stability of the liquid product indicates that both N and Br are compounded in some way the product will be referred to hereinafter for short as nitrosyl tribromide, it being understood that the formation of this compound has as yet not been fully established.

During the heat treatment the nitrosyl tribromide is decomposed yielding nitrogen oxide and free bromide.

The chemical reactions occurring during the process according to the invention can be summed up by the following equations, always assuming that nitrosyl tribromide forms in the first stage of the reaction.

(1)  $3Br^- + HNO_3 + 3HCl \rightarrow NOBr_3 + 2H_2O + 3Cl^-$
(2)  $2NOBr_3 \rightarrow 2NO + 3Br_2$
(3)  $1\frac{1}{2}Br_2 + NO + 2H_2O \rightarrow HNO_3 + 3HBr$
(4)  $2NO + H_2O + 1\frac{1}{2}O_2 \rightarrow 2HNO_3$ The products of reactions 3 and 4 are recycled to the original brine.

The overall reaction occurring may be described by the following equation:

(5)  $2Br^- + 2HCl + \frac{1}{2}O_2 \rightarrow Br_2 + H_2O + 2Cl^-$

It is thus seen that the reactants consumed in the process according to the invention are $HCl$ on the one hand which is converted into a neutral chloride salt and oxygen on the other hand. The latter is always available in abundance from the air while the former is also available in abundance as an industrial product which sometimes is a waste whose disposal constitutes a serious problem.

It is further seen that in the overall balance the nitrogen-bromine compound forming in reaction 1 does not figure in the equation of the overall reaction and the exact nature thereof is therefore immaterial.

In accordance with one embodiment of the invention $HCl$ and $HNO_3$ are admixed in situ and the $HNO_3$, produced from the gaseous nitrogen oxide fraction emerging from said heat treatment of the liquid product containing nitrogen and bromine, is recycled directly to the process.

In accordance with another embodiment of the invention a ready mixture of $HNO_3$ and $HCl$ is fed to the process. Such a mixture may, for example, be withdrawn from a process in which an alkali metal chloride $MCl$ is converted into the nitrate by reaction with nitric acid according to the equation $$MCl + HNO_3 \rightleftharpoons MNO_3 + HCl$$

The mother liquor from this reaction contains $HNO_3$ and $HCl$ in substantially the desired ratio and can thus be utilized directly for the process according to the invention. When proceeding in this manner the $HNO_3$ that is produced in accordance with the invention from the gaseous nitrogen oxide emerging from said heat treatment is recycled to the $MNO_3$ process. This embodiment is particularly attractive in case of the production of $KNO_3$ from $KCl$ and $HNO_3$, the reaction being $$3KCl + 4HNO_3 \rightarrow 3KNO_3 + 3HCl + HNO_3$$

The concentration of the hydrochloric acid and nitric acid used in accordance with the invention should not be lower than about 3 molar. Above this minimum the concentration of the acids is not critical; it will, as a rule, be corelated experimentally to the nature of the bromide brine used. The rate of acid addition is equally not critical but should be such that the reaction mixture remains at all times acidic.

There are also no critical limitations for the purity of the acids and various technical grade acids may be employed. Moreover, the $HNO_3$ employed may be produced in situ from a nitrate and hydrochloric acid.

While the bulk of the nitric acid consumed by the process is recovered and recycled there occur certain mechanical losses which have to be made up. For the make-up it is possible to use either nitric acid proper or, alternatively, any available nitrogen oxide or nitrogen-oxygen acid in which the nitrogen is of a valency lower than 5 since in the process they will be oxidized to nitric acid. By the same token the process may be initiated by a lower valency oxide or acid of nitrogen.

Various kinds of bromide brines may be used so long as they conform to the requirements indicated above, and it is possible to recover bromine both from very concentrated brines such as, for example, a brine obtained during the production of KCl from the Dead Sea (Ireaèl) and generally referred to as "end brine," as well as from bitterns. In this connection it has been found that the presence of calcium and magnesium ions stimulate the reaction while the presence of sulfate ions slow the reaction, possibly because of the formation of nitrosyl sulfuric acid which is a non-volatile stable product.

The first stage of the process according to the invention—introduction of HCl and $HNO_3$ into the brine—is preferably conducted at an elevated temperature which should be the higher the lower the bromide concentration in the brine. This can be achieved by the introduction of steam into the reaction mixture which at the same time serves for stripping the mixture of the nitrosyl tribromide.

The invention is illustrated, by way of example only in the accompanying drawing which is a flow sheet of an installation for the production of elementary bromine in accordance with the invention.

The bromide brine serving as starting material is introduced through a heat exchanger 1 where it is submitted to a preliminary heating by heat exchange with hot liquid discharged from a reactor column 2 and is conducted into another heat exchanger 3 where it is heated by heat exchange with steam. The hot brine is sprayed into the top of reactor column 2 while steam is introduced into the bottom of the same column.

Hydrochloric acid and nitric acid are discharged concurrently from their respective containers 4 and 5 and introduced in a combined flow in the ratio of substantially $HNO_3:HCl=1:3$ into the upper section of reactor column 2. In this upper section the first stage reaction between bromide, $HNO_3$ and HCl occurs. At the same time the steam flowing in countercurrent from below expels the resulting nitrosyl tribromide into condenser 6 while the remaining hot liquid is discharged from the bottom of column 2 and is conducted through the heat exchanger 1 from where it is discharged and discarded.

In condenser 6 the hot nitrosyl tribromide-water mixture is condensed and the condensed liquids are discharged into a separator 7 from where the upper aqueous phase is returned into column 2; the heavy liquid nitrosyl tribromide phase is conducted into a fractionation column 8 and the remaining gaseous phase is conducted into an absorption tower 13 where they are contacted with water and any bromine is converted into HBr in accordance with Equation 3 given hereinbefore. The resulting mixture of $HBr+HNO_3$ is recycled to column 2 while the remaining nitrogen oxide is conducted to an absorption-oxidation vessel 14.

In fractionation column 8 the nitrosyl tribromide is decomposed thermally and the resulting products are submitted to fractionation. The liquid bromine is discharged from the bottom of column 8 into a container 9 where it is heated for the expulsion of residual water and nitrogen oxide, is then cooled in a heat exchanger 11 by means of cold water and is collected in a container 12.

The gaseous phase emerging from column 8 is conducted through a condenser 10, where some of the escaping bromine is condensed and returned to the column, and the remaining gaseous phase emerging from condenser 10 is combined with that emerging from separator 7 and is conducted into absorption tower 13.

In absorption-oxidation vessel 14 the nitrogen oxide is contacted with water and air with the formation of $HNO_3$ in accordance with Equation 4 given hereinbefore and the resulting nitric acid solution is recycled to container 5.

The invention is further illustrated by the following working examples which illustrate the production of bromine in accordance with the invention.

EXAMPLE 1

To 1 liter of a brine containing 443 g./l. of magnesium chloride and 10.0 g./l. of bromide in the form of sodium bromide there was added a 10% aqueous hydrogen solution in an amount corresponding to 6.1 g. of HCl, being 4 equivalents of hydrogen chloride for every 3 equivalents of bromide, together with concentrated nitric acid in a quantity corresponding to 2.65 g. of HNO. The reaction mixture was boiled by introduction of steam and the brown gases which evolved were passed through a heat exchanger and condensed. There formed two layers, an upper aqueous layer and a lower brown layer. The non-condensed gases were trapped in an alkaline solution.

The lower brown layer was analysed and had the following composition:

|    | Percent |
|----|---------|
| Br | 89.5    |
| NO | 9.5     |
| Cl | 1.0     |

The bromine balance was as follows:

|    | Percent |
|----|---------|
| Left in solution (bromine+bromide) | 11 |
| In the aqueous phase | 1 |
| Condensed in the form of nitrosyl tribromide | 80 |
| Trapped in the alkaline solution | 8 |

The brown liquid that was separated from the upper aqueous phase was fractionated in a distillation column. After 2 hours there collected in the vessel below the column liquid bromine containing less than 0.1% of nitrogen oxide. The gases leaving the top of the column contained 52% by weight of bromine and 48% by weight of nitrogen oxide. These gases were passed through an absorber tower where they were contacted with water, and air and the gases leaving that tower consisted of 94% of nitrogen oxide the balance being water vapour. The bromine in that gas amounted to less than 0.2% by weight. This gas was reconverted into nitric acid by water absorption and simultaneous oxidation.

The nitrogen oxide balance was as follows:

|    | Percent |
|----|---------|
| Losses in the magnesium chloride solution | 10 |
| Left in the aqueous phase during condensation | 7 |
| Oxidized in the wash water | 11 |
| Purified gas ready for reconversion into $HNO_3$ | 72 |

Only the first item constitutes a loss whilst items 2, 3 and 4 constitute that portion of the nitrogen oxide that is recovered and recycled as $HNO_3$.

EXAMPLE 2

The procedure of Example 1 was repeated using as starting solution 6 liters of a brine containing 581 g./l. of calcium chloride and 4.5 g./l. of bromide in the form of sodium bromide. Hydrochloric acid was added in the form of a 15% aqueous solution in a quantity corresponding to 27 g. of HCl, being 6.6 equivalents of HCl for every 3 equivalents of bromide, and nitric acid was added in the form of a 50% aqueous solution in a quantity corresponding to 7.2 g. of $HNO_3$. The solution was heated to boiling by the introducting of steam. The brown gases that evolved were condensed and there formed an upper aqueous and a lower brown, nontransparent layer. Any non-condensed gases were trapped in an alkaline solution.

The lower brown liquid analysed:

|    | Percent |
|----|---------|
| Br | 89      |
| NO | 10.5    |
| Cl | 0.5     |

The bromine balance was as follows:

|    | Percent |
|----|---------|
| Left in solution (bromine+bromide) | 15 |
| In the aqueous phase | 1 |
| Condensed in the form of nitrosyl tribromide | 75 |
| Trapped in the alkaline solution | 9 |

The non-aqueous nitrosyl bromide phase was worked up as in Example 1.

EXAMPLE 3

The procedure of Example 1 was repeated using as starting solution 2 liters of a brine containing 402 g./l. of calcium chloride and 9.48 g./l. of bromide in the form of sodium bromide. Hydrochloric acid was added in the form of an aqueous 15% solution in an amount corresponding to 17.3 g. of HCl, being 6 equivalents of HCl for every 3 equivalents of bromide, and nitric acid was added in the form of a 50% solution in an amount corresponding to 5.0 g. of $HNO_3$.

The brown liquid analysed:

| | Percent |
|---|---|
| Br | 90 |
| NO | 9 |
| Cl | 1 |

The bromine balance was as follows:

| | Percent |
|---|---|
| Left in solution ((bromine+bromide) | 11 |
| In the aqueous phase | 1.5 |
| Condensed as nitrosyl tribromide | 78.5 |
| Trapped in the alkaline solution | 9 |

The brown nitrosyl tribromide was worked up as in Example 1.

EXAMPLE 4

The starting solution was Dead Sea end brine having the following composition:

| | G./l. |
|---|---|
| $Mg^{++}$ | 87 |
| $Ca^{++}$ | 36 |
| $K^+$ | 2 |
| $Na^+$ | 4 |
| $Cl^-$ | 320 |
| $Br^-$ | 11.4 |

To 6 liters of this solution there was added technical 17% hydrochloric acid in a quantity corresponding to 5 equivalents for every 3 equivalents of bromide, that is 52 g. HCl. Nitric acid was added in the form of a 40% aqueous solution in a quantity corresponding to 18.0 g. $HNO_3$. The procedure was as in Example 1.

The brown liquid analysed:

| | Percent |
|---|---|
| Br | 90 |
| NO | 9.5 |
| Cl | 0.5 |

The bromine balance was as follows:

| | Percent |
|---|---|
| Left in solution (bromine+bromide) | 9 |
| In the aqueous phase | 1 |
| Condensed as nitrosyl tribromide | 80 |
| Absorbed in the alkaline trap | 10 |

The nitrosyl tribromide was worked up as in Example 1. The utilization of the nitrogen oxide was as follows:

| | Percent |
|---|---|
| Losses of nitric acid in the end brine | 9 |
| Nitrogen oxide in the aqueous phase from condensation | 8 |
| Nitrogen oxide in alkaline trap | 9 |
| Purified gas for reconversion into $HNO_3$ | 74 |

It follows that only 9% were lost while the remainder could be recovered and recycled.

EXAMPLE 5

The starting solution was 1 liter of a brine containing 350 g./l. of magnesium chloride, 30 g./l. of magnesium sulfate and 10 g./l. bromide in the form of sodium bromide. The hydrochloric acid added was in the form of a 15% aqueous solution and the quantity corresponded to 9.1 g. of HCl being 6 equivalents of HCl for every 3 equivalents of bromide. The nitric acid was added in the form of a 50% aqueous solution in a quantity corresponding to 2.6 g. of $HNO_3$. The procedure was as in Example 1 and the brown liquid analysed:

| | Percent |
|---|---|
| Br | 90 |
| NO | 9.5 |
| Cl | 0.5 |

The bromine balance was as follows:

| | Percent |
|---|---|
| Left in solution (bromine+bromide) | 16 |
| In the aqueous phase | 1.5 |
| Condensed in the form of nitrosyl tribromide | 72 |
| Absorbed in the alkaline trap | 10.5 |

The nitrosyl tribromide phase was worked up as in Example 1.

What we claim is:

1. A process for the production of elementary bromine from a bromide brine containing at least 100 grams per liter of halide ions of which at least 2 grams per liter must be bromide, at least 1.4 moles per liter of $Ca^{++}$ or $Mg^{++}$ or a mixture of the two and not more than 75 grams per liter of $SO_4^{--}$, comprising introducing into the brine nitric acid and hydrochloric acid in a molar ratio of about 1:3 and in a combined molar concentration of at least 3;

heating the reaction mixture and subjecting it to a stripping operation by which a gaseous fraction containing $NOBr_3$ is separated from the liquid reaction mixture;

condensing said gaseous fraction, stratifying the condensate and separating a fraction enriched in $NOBr_3$;

thermally decomposing said enriched fraction;

fractionating the product of the decomposition; and withdrawing, on the one hand, a $Br_2$-containing fraction as product, and on the other hand, a NO-containing fraction, and submitting said latter fraction to an oxidation and hydration treatment to produce $HNO_3$ for reuse.

2. A process according to claim 1, wherein said heat treatment and stripping operations are carried out by the introduction of steam into the reaction mixture.

3. The process according to claim 1, wherein the nitric acid and hydrochloric acid are admixed in situ and the produced nitric acid is recycled to the process.

4. A process according to claim 1, wherein the starting mixture of nitric acid and hydrochloric acid in a ratio of approximately $HNO_3$:HCl=1:3 is withdrawn mother liquor from a process in which a potassium chloride is reacted with a nitric acid to produce a potassium nitrate.

5. The process according to claim 1, wherein said bromide brine is Dead Sea end brine.

References Cited

UNITED STATES PATENTS

| 1,267,638 | 5/1918 | Datta | 23—216 |
|---|---|---|---|
| 1,917,762 | 7/1933 | Grebe et al. | 23—217 |
| 1,942,886 | 1/1934 | Uebler. | |
| 2,359,221 | 9/1944 | Kenaga | 23—216 |
| 3,107,154 | 10/1963 | Schächter et al. | 23—216 |
| 3,131,028 | 4/1964 | Stow | 23—215 |
| 3,136,602 | 6/1964 | Berger | 23—162 |
| 3,152,870 | 10/1964 | Baumgartner et al. | 23—219 |
| 3,290,115 | 12/1966 | Smai et al. | |

OSCAR R. VERTIZ, Primary Examiner.

G. O. PETERS, Assistant Examiner.

U.S. Cl. X.R.

23—203